United States Patent
Staudenmaier et al.

(10) Patent No.: US 10,409,732 B2
(45) Date of Patent: Sep. 10, 2019

(54) SPARSE MATRIX ACCELERATOR

(71) Applicant: NXP USA, Inc., Austin, TX (US)

(72) Inventors: Michael Andreas Staudenmaier, Munich (DE); Leonardo Surico, Haar (DE); Maik Brett, Taufkirchen (DE)

(73) Assignee: NXP USA, Inc., Austin, TX (US)

( * ) Notice: Subject to any disclaimer, the term of this patent is extended or adjusted under 35 U.S.C. 154(b) by 121 days.

(21) Appl. No.: 15/609,802

(22) Filed: May 31, 2017

(65) Prior Publication Data

US 2018/0349290 A1 Dec. 6, 2018

(51) Int. Cl.
*G06F 12/1081* (2016.01)
*G06F 13/28* (2006.01)

(52) U.S. Cl.
CPC .......... *G06F 12/1081* (2013.01); *G06F 13/28* (2013.01); *G06F 2212/656* (2013.01)

(58) Field of Classification Search
CPC . G06F 12/1081; G06F 13/28; G06F 2212/656
See application file for complete search history.

(56) References Cited

U.S. PATENT DOCUMENTS

| | | | |
|---|---|---|---|
| 8,364,739 B2 | 1/2013 | Baskaran et al. | |
| 8,554,820 B2 | 10/2013 | Brokenshire et al. | |
| 8,612,723 B2 | 12/2013 | Burkart et al. | |
| 8,676,874 B2 | 3/2014 | Fossum | |
| 8,775,495 B2 | 7/2014 | Lumsdaine et al. | |
| 8,862,653 B2 | 10/2014 | Bakos | |
| 9,367,519 B2 | 6/2016 | Strauss et al. | |
| 2007/0073922 A1* | 3/2007 | Go | G06F 13/28 710/22 |
| 2011/0320768 A1* | 12/2011 | Pell | G06F 12/16 712/30 |
| 2013/0031440 A1* | 1/2013 | Sharon | G06F 11/1012 714/758 |
| 2013/0262538 A1* | 10/2013 | Wegener | H03M 7/30 708/203 |
| 2016/0110113 A1* | 4/2016 | Rangachari | H03M 7/30 711/154 |
| 2016/0179750 A1 | 6/2016 | Zhou | |
| 2016/0328661 A1* | 11/2016 | Reese | G06F 16/29 |
| 2018/0315158 A1* | 11/2018 | Nurvitadhi | G06T 1/20 711/154 |

* cited by examiner

*Primary Examiner* — Idriss N Alrobaye
*Assistant Examiner* — Ronald T Modo (57) ABSTRACT

An electronic device includes a first memory subsystem, a second memory subsystem and a direct memory access controller. In response to a first type of request from a processor, the direct memory access controller requests data from the first memory subsystem and provides the data to the second memory subsystem. In response to a second type of request from a processor, the direct memory access controller requests an uncompressed matrix from the first memory subsystem, compresses the uncompressed matrix to generate a compressed matrix, and provides the compressed matrix to the second memory subsystem. In response to a third type of request from a processor, the direct memory access controller requests a compressed matrix from the second memory subsystem, un-compresses the compressed matric to generate an uncompressed matrix, and provides the un-compressed matrix to the first memory subsystem.

19 Claims, 5 Drawing Sheets

SPARSE MATRIX ACCELERATOR

FIELD OF THE DISCLOSURE

The present disclosure relates generally to digital systems and methods, and more particularly to accelerating processing of matrix data in a digital system.

BACKGROUND

A significant portion of processing for particular applications performed by data processing systems, for example Advanced Driver Assistance Systems, is based on linear algebra computation. Linear algebra computation uses information organized in matrices. Linear algebra computation includes operations which can accept one or more matrices as operands, and produce a matrix as a result. For example, two operand matrices can be multiplied together according to the rules of linear algebra to produce a result matrix. Other linear algebra operations accept a matrix and a scalar value as operations, producing a matrix as a result. For example, each value in a matrix can be multiplied by the scalar value.

A matrix for linear algebra computation can be represented as a rectangular array of numerical values arranged in rows and columns. A size of a matrix is indicated by the number of rows, indicated by the symbol m, and the number of columns, indicated by the symbol n. Individual columns of a matrix can be identified by integer values beginning with '0' and ending with m−1. An integer value identifying a column can be referred to as the index of the column. Similarly, individual rows of a matrix can be identified by integer values beginning with '0' and ending with n−1 and the integer value associated with a particular row can be referred to as its index. Each element of a matrix is a storage location corresponding to exactly one row and one column. A single element of a matrix can be identified by a pair of numbers indicating the row and column of the element. For example, an element in the first column and last row of a matrix can be identified by the pair (0, n−1).

Matrices having particular properties occur in some applications. A matrix which has a large number of individual elements with a zero value relative to the number of elements with a non-zero value can be referred to as a sparse matrix. Sparse matrixes are common in some types of data processing functions. Some matrices are not sparse matrices but can be transformed to sparse matrices in particular circumstances. A matrix can have particular elements with values which are very small, numerically, in comparison with the values of other elements of the matrix. A matrix which has a large number of elements which have zero or very small values in comparison with the number of elements having large non-zero values can be referred to as a near-sparse matrix. In some applications of a data processing system, converting a near-sparse matrix to a sparse matrix by setting the small non-zero values to zero results in acceptable functionality. In other applications, linear algebra operations on a sparse matrix produce a result that should be a sparse matrix but is not. For example, inverting an operand sparse matrix to obtain a result matrix and then inverting the result matrix should result in a second result matrix having the same values as the operand sparse matrix. However, due to the finite precision of mathematical operations in a data processing system, the output of the second matrix inversion can have elements that should have zero values but instead have very small non-zero values. In computations in a data processing system, knowledge of features that a result matrix should have can allow values near zero to be set to exactly zero.

BRIEF DESCRIPTION OF THE DRAWINGS

The present disclosure may be better understood, and its numerous features and advantages made apparent to those skilled in the art by referencing the accompanying drawings. It will be appreciated that for simplicity and clarity of illustration, elements illustrated in the Figures have not necessarily been drawn to scale. For example, the dimensions of some elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

In accordance with an embodiment of the present disclosure, a digital system includes a data processor, an internal memory system, a direct memory access controller and an external memory subsystem. The data processor can perform operations based on matrix data structures. In response to configuration and control information provided by the data processor, the direct memory access controller can retrieve (read) compressed matrix data from the external memory subsystem, un-compress the matrix data, and provide (write) the un-compressed matrix data to the internal memory. In response to further configuration and control information provided by the data processor, the direct memory access controller can read un-compressed matrix data from the internal memory, compress the matrix data, and write the compressed matrix data to the external memory subsystem.

Matrices used in linear algebra computation can be stored by a memory of a data processing system. Memory of a data processing system can be arranged as a sequence of storage locations, each storage location having an address. Matrix data can be stored in such a memory by storing each element of the two dimensional matrix data structure in memory according to a fixed procedure. For example, matrix elements can be stored column by column ordered by the indices of the columns, with elements of a column stored in increasing order of the row indices of the elements. This method of storing matrix elements can be referred to as column major ordering. For a matrix with three rows and three columns, the element (0,0) would be stored at a first memory location, followed by the elements (0,1) and (0,2) in successive memory locations to complete storing the first column. The elements of the second column would be stored at successive memory locations in the order (1,0), (1,1), (1,2), followed by the elements of the third column (2,0), (2,1), (2,2). It will be appreciated that other convention for storing matrix elements can be implemented, such as row major ordering. Row major ordering differs from column major ordering in that elements are stored row by row, with elements in a particular row stored in order of increasing column index.

Memories in data processing systems can perform a maximum number of reads and writes in any particular time period. This maximum number is determined by various factors. The factors include the semiconductor technology used in implementing the memory as well as the details of the interconnect between the memory and a processor. A memory system can be characterized by a maximum number of bytes per second that can be transferred into and out of the memory system. This quantity can be referred to as the memory system's bandwidth. Bandwidth of memories in data processing systems can be unaffected by the values transferred. In particular, a transfer of a zero value requires the same memory bandwidth as does the transfer of a non-zero value. Thus, a transfer of a sparse matrix into or out of a memory system can take the same about of memory bandwidth as a transfer of any other matrix of the same size. Transfers of matrices into and out of a memory system can use a large fraction of bandwidth in particular applications. Matrices in these applications can be large, comprising many rows and columns and so a large number of individual elements.

Figure 1:
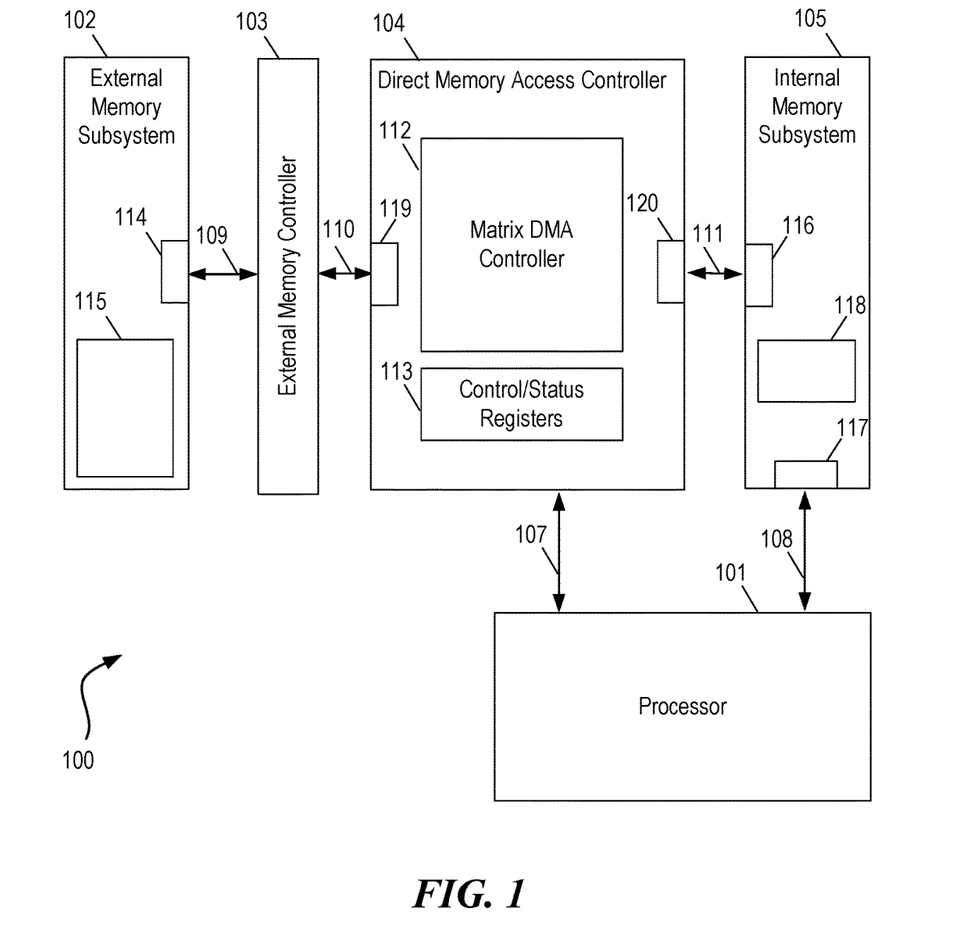
FIG. 1 is an illustration of a digital system according to at least one embodiment of the present disclosure.

FIG. 1 illustrates an embodiment of a device 100 that processes matrix information. Device 100 includes data processor 101, external memory subsystem 102, external memory controller 103, direct memory access (DMA) controller 104, and internal memory subsystem 105. According to an embodiment, data processor 101, external memory controller 103, DMA controller 104, and internal memory subsystem 105 are integrated at common semiconductor substrate or package. Data processor 101 can be configured to execute code that can implement particular functions of device 100 involving the manipulation of data represented in a matrix format, and in particular to configure the DMA controller 104 to decompress sparse matrices that are used as operands during an arithmetic manipulation, and to compress the result, where it will be understood that sparse matrices include frequent zero, or near zero, entries. Data processor 101 is further connected to direct memory access controller 104 by control bus 107. Data processor 101 is yet further connected to internal memory subsystem 105 by internal memory bus 108. It will be appreciated that data processor 101 can also be connected to the external memory controller 103 (not shown).

External memory subsystem 102 comprises memory access port 114 and memory 115, which is connected to external memory controller 103 by external memory bus 109. External memory subsystem 102 can store executable program code and data for use in device 100 in memory 115. External memory 115 can be a relatively slow memory, as compared to the internal memory 118, such as synchronous dynamic random-access memory (SDRAM), double data rate (DDR) SDRAM, DDR2 memory, DDR3 memory, DDR 4 memory or the like. External memory bus 109 is an interconnect specific to a type of external memory subsystem 102.

External memory controller 103 provides specific signals required to access external memory subsystem 102 based upon read and write access requests of the direct memory access controller 104 received over bus 110. It will be appreciated, that other modules integrated at a common substrate or package along with the external memory controller 103 can be connected to the external memory controller 103 via bus 110, or other buses.

DMA controller 104 is connected to external memory controller 103 by external memory controller bus 110, to internal memory subsystem 105 by internal memory bus 111, and to data processor 101 by control bus 107. Direct memory access controller 104 comprises matrix DMA controller 112, control/status registers 113, load/store circuitry 119 and load/store circuitry 120. Load/store circuitry 119 and load/store circuitry 120 provide access to external memory subsystem 102 and internal memory subsystem 105, respectively, for Matrix DMA Controller 112. In embodiments, load/store circuitry 119 and load/store circuitry 120 comprise distinct load circuitry and store circuitry. In other embodiments, load/store circuitry 119 and load/store circuitry 120 comprise circuitry capable of performing both loads and stores.

Matrix DMA controller 112 can read uncompressed matrices from internal memory subsystem 105 using load/store circuitry 120, compress the uncompressed matrices, and write the compressed matrices to external memory subsystem 102 using load/store circuitry 119. Matrix DMA controller 112 can further read compressed matrices from external memory subsystem 102 using load/store circuitry 119, un-compress the compressed matrices, and write the uncompressed matrices to internal memory subsystem 105 using load/store circuitry 120. In an embodiment, matrix DMA controller 112 can also read uncompressed matrices from internal memory subsystem 105 and write the uncompressed matrices to external memory subsystem 102. In an embodiment, matrix DMA controller 112 can also read uncompressed matrices from external memory subsystem 102 and write the uncompressed matrices to internal memory subsystem 105. In an embodiment, matrix DMA controller 112 can also read compressed matrices from internal memory subsystem 105 and write the compressed matrices to external memory subsystem 102. In an embodiment, matrix DMA controller 112 can also read compressed matrices from external memory 102 subsystem and write the compressed matrices to internal memory subsystem 105.

Control/status registers 113 are storage locations that store control information provided by data processor through control bus 107. The control information stored at register 113 can include source and destination addresses for data transfer operations, including data transfer operations performed by matrix DMA controller 112. The control information can further include indicators regarding mode of operation, for example whether or not specific information is matrix information upon which compression or decompression is to be performed by matrix DMA controller 112, whether a particular compression technique to be employed by matrix DMA controller 112, and the like. Control information can also include commands to begin or to terminate a DMA transfer, indications of the direction of transfers, and the like. Status information provided by control/status registers can include, indications of completion of DMA transfers, indications of error conditions, sizes of transfers, status regarding compression or decompression operations, and the like.

Internal memory subsystem 105 comprises memory access ports 116 and 117, and internal memory 118. Internal memory subsystem 105 is connected to direct memory access controller 104 by internal memory bus 111 through memory access port 116. Internal memory subsystem 105 is further connected to data processor 101 by internal memory bus 108 through memory access port 117. In an embodiment, internal memory buses 108 and 111 can be implemented with a single bus within device 100 and memory access ports 116 and 117 represent a single access port. In another embodiment, internal memory buses 108 and 111 are distinct connections from internal memory subsystem 105 to data processor 101 and direct memory access controller 104, respectively, in which case the internal memory subsystem 105 can be a dual ported memory or a multibank memory having a controller that can perform accesses to different banks In embodiments of the present disclosure, internal memory 118 is a faster type of memory than external memory 115. For example, internal memory 118 can be static random access memory (SRAM) on a semiconductor device. In an embodiment, internal memory 118 can provide an order of magnitude greater memory bandwidth than external memory 115. For example, when internal memory 118 is implemented in a semiconductor system using an on-chip SRAM with a large degree of parallelism, a memory bandwidth of 50-100 GB/second can be achieved. In contrast, external memory implemented with a DDR memory system achieve high bandwidth rates at a relatively high system cost, often resulting in bandwidths lower than the bandwidths of the internal memory. For example, a 32 bit DDR4 module achieves a memory bandwidth in the rage of 7-9 GB/second.

During operation of device 100, data processor 101 performs operations, such as arithmetic operations, on uncompressed matrix information retrieved from internal memory subsystem 105. Uncompressed matrices can be stored at external memory subsystem 102, but as buses servicing external memory subsystem 102 can have substantially less data transfer bandwidth than buses servicing internal memory subsystem 105, and because matrices operated on by data processor 101 can be large, transfer of uncompressed matrices to and from external memory can be slow. Slow transfers of matrices to and from external memory subsystem 102 can reduce performance of device 100. Matrices can, therefore, be compressed such that the amount of data transferred, and thus the time taken to transfer a compressed representation of a particular matrix, is significantly less than the time required to transfer an uncompressed matrix.

The amount of compression of sparse matrices, which are common in certain applications, can be especially significant. Sparse matrices are characterized by having a relatively large number of zero, or near zero, values. Sparse matrices can be compressed as will be described herein. While, data processor 101 could perform such a matrix compression, it would be at the expense of using limited processing bandwidth in the data processor 101. As DMA controller 104 is available to transfer information between external memory subsystem 102 and internal memory subsystem 105, it is advantageous to add compression and decompression features to DMA controller 104. So implemented, DMA controller 104 can perform compression and decompression on a matrix during the transfer of the matrix from one memory to the other.

Thus, matrices can be stored by the DMA controller 104, at the request of processor 101, for example, in a compressed matrix format at external memory subsystem 102. Conversely, the compressed matrix can be un-compressed by the DMA controller 104 and stored in internal memory subsystem 105 upon by the data processor 101 for the purpose of performing an arithmetic operation on the uncompressed matrix.

Thus, DMA controller 104 can transfer requested matrices between memory systems, performing any necessary compression and decompression operations, without intervention of the requesting device. For example, an operation of device 100 can require a data processor 101 to perform a matrix inversion operation. In response, data processor 101 writes control information to control/status registers 113 of DMA controller 104 specifying that a compressed matrix stored at external memory subsystem 102 is to be retrieved and saved as an uncompressed matrix at internal memory subsystem 105. It will be appreciated, that control information can includes source and destination addresses, compression-type information, and the like. According to the illustrated embodiment, the DMA controller 104, using matrix DMA controller 112, reads the compressed matrix from external memory subsystem 102, uncompresses the matrix, writes the uncompressed matrix to internal memory subsystem 105, and provides an indication at status/control registers 113, or other notification, indicating the completion of the transfer.

Upon being notified that the requested matrix has been decompressed and stored a internal memory subsystem 105, data processor 101 accesses the matrix from internal memory subsystem 105 and performs the matrix inversion operation. It will be appreciated, that for ease of discussion, it is presumed the data processor 101 accesses operands directly from, and stores result directly to, internal memory subsystem 105. Alternatively, the operands and results may first be stored at registers of the processor 101 that are accessed the arithmetic logic units of the data processor 101. Upon completing the matrix inversion operation, data processor 101 can write control information to control/status registers 113 that indicates a transfer of the uncompressed matrix from internal memory subsystem 105 to a compressed representation at external memory subsystem 102 is to be performed. DMA controller 104, using matrix DMA controller 112, reads the uncompressed, inverted, matrix from internal memory subsystem 105, compresses the inverted matrix, and stores the compressed, inverted, matrix at external memory subsystem 102.

Figure 2:
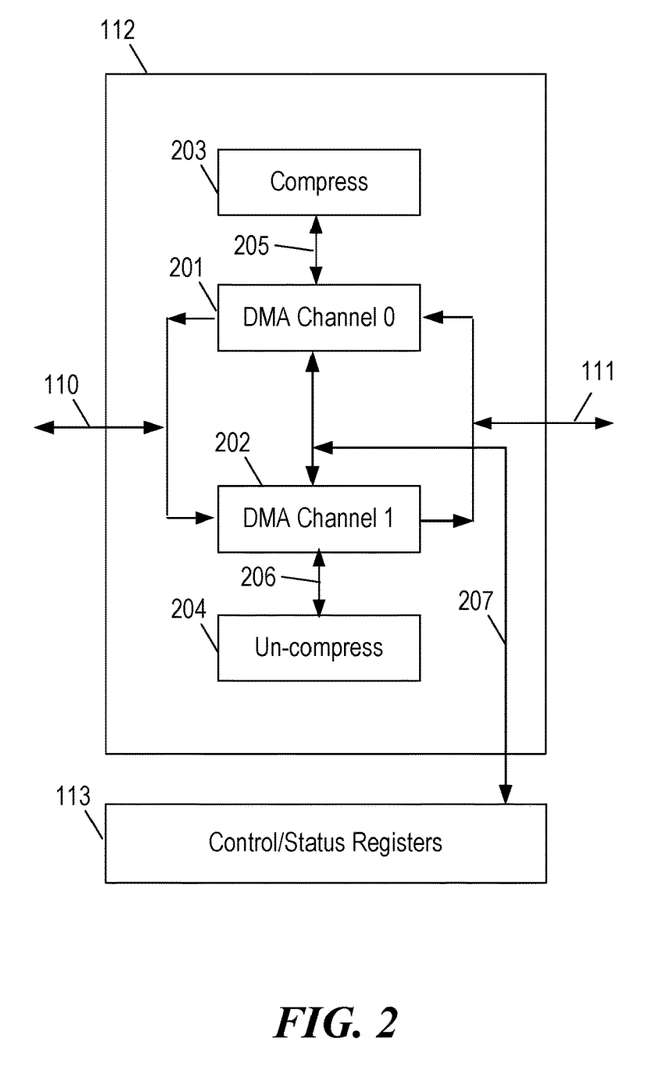
FIG. 2 is an illustration of a direct memory access controller according to at least one embodiment of the present disclosure.

FIG. 2 illustrates an embodiment of matrix DMA controller 112. Matrix DMA controller 112 includes DMA channel 0 201, DMA channel 1 202, compress module 203 and un-compress (decompress) module 204. DMA channel 0 is connected to compress module 203 by compress module interface 205. DMA channel 0 is further connected to external memory controller bus 110 in order to write data to external memory subsystem 102. DMA channel 0 is yet further connected to internal memory bus 111 in order to read data from internal memory subsystem 105. DMA channel 1 is connected to un-compress module 204 by un-compress module interface 206. DMA channel 1 is further connected to external memory controller bus 110 in order to read data from external memory subsystem 102. DMA channel 1 is yet further connected to internal memory bus 111 in order to write data to internal memory subsystem 105.

DMA channels 0 and 1 are further connected to control/status registers 113. Control/status registers 113 can contain control and status registers for each DMA channel, allowing data processor 101 to control the operation of the DMA channels and to receive status indications from the DMA channels. In an embodiment, information in registers control/status registers 113 can configure more than one DMA channel. For example, address ranges that store compressed matrices can be indicated by sets of address range registers at control/status registers 113. A DMA transfer on either DMA channel 0 or DMA channel 1 indicating a read from an address range indicated for compressed matrices can have un-compression enabled without further intervention from data processor 101. Writes of data to such ranges can have compression automatically enabled by the DMA channels. Address ranges storing un-compressed matrices can be similarly indicated, and have compression and un-compression automatically enabled for transfers from and to these address regions, respectively. Alternatively, the processor can set specific indicators, e.g., flags, when setting up the DMA controller that indicate to the DMA controller that the associated data is matrix information to be compressed or decompressed, accordingly. Those skilled in the art will appreciate that other control functions of DMA channels can be employed with the present invention. For example, each DMA channel can have a control register in control/status registers 113 that allows an automatically indicated compression to be disabled for a particular transfer, thus allowing a DMA channel to transfer raw data.

During operation, data processor 101 can configure matrix DMA controller 112 to perform data transfers combined with compress or un-compress operations by writing control information to control/status registers 113. In the example discussed previously, a compressed representation of a matrix is stored at external memory subsystem 102 is un-compressed and the matrix transferred to internal memory subsystem 105. To perform the transfer and un-compression operations, data processor 101 configures DMA channel 1 202 by writing configuration information to control/status registers 113. Configuration information written to control/status registers 113 by data processor 101 can include a source address for the compressed matrix at external memory subsystem 102, a destination address for the uncompressed matrix at internal memory subsystem 105, a size of the matrix, an indication that the matrix should be un-compressed, and an indication that DMA channel 1 202 is to execute the transfer. DMA channel 1 202 begins a DMA transfer by retrieving compressed matrix elements from external memory subsystem 102 through external memory controller bus 110. As the configuration written to control/status registers 113 indicates that DMA channel 1 202 should un-compress the matrix, DMA channel 1 202 provides the compressed matrix elements to un-compress module 204. Un-compress module 204 uses the compressed matrix elements to generate the un-compressed matrix and provides the un-compressed matrix to DMA channel 1 202. DMA channel 1 202 then writes the uncompressed matrix to internal memory 105 subsystem through internal memory bus 111.

Similarly, to transfer an un-compressed matrix from internal memory 105 to a compressed matrix format at external memory subsystem 102, data processor 101 configures DMA channel 0 201 by writing configuration information to control/status registers 113. Configuration information written to control/status registers 113 by data processor 101 can include a source address for the uncompressed matrix at internal memory subsystem 105, a destination address for the compressed matrix at external memory subsystem 102, a size of the matrix, an indication that the matrix should be compressed, and an indication that DMA channel 0 201 is to execute the transfer. DMA channel 0 201 begins a DMA transfer by retrieving un-compressed matrix elements from internal memory subsystem 105 through internal memory bus 111. As the configuration written to control/status registers 113 indicates that DMA channel 0 201 should compress the matrix, DMA channel 0 201 provides the un-compressed matrix elements to compress module 203. Compress module 203 uses the un-compressed matrix elements to generate a compressed matrix, and provides the compressed matrix to DMA channel 0 201. DMA channel 0 201 the writes the compressed matrix to external memory subsystem 102 through external memory controller bus 110.

In an embodiment, a single DMA channel can be connected to both a compress module and to an un-compress module. The DMA channel can perform transfers both to and from external memory, compressing and un-compressing matrices according to configuration information provided by a data processor.

Figure 3:
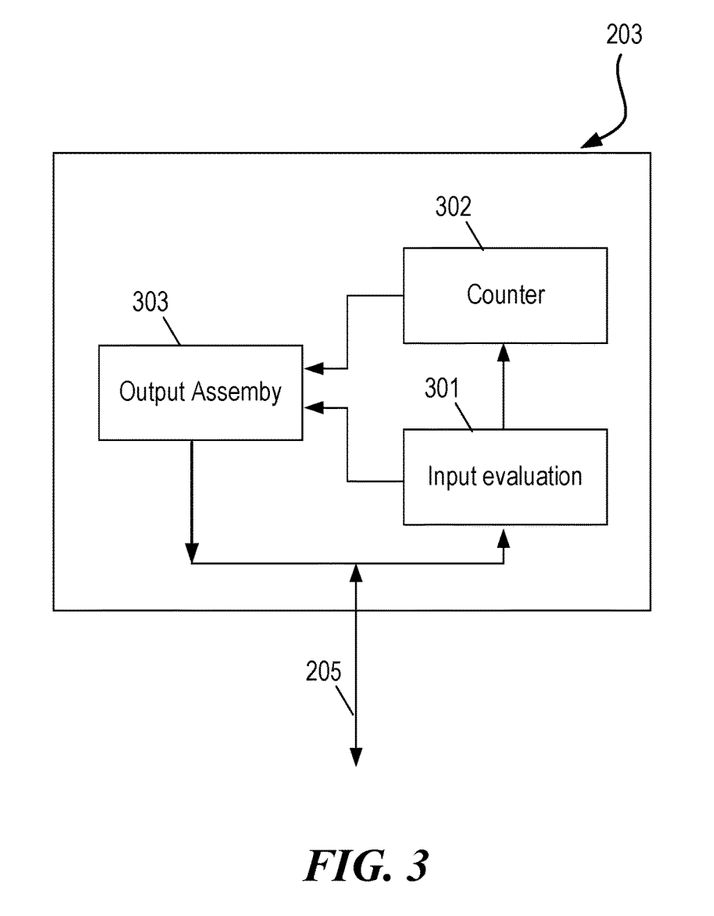
FIG. 3 is an illustration of a matrix compression module according to at least one embodiment of the present disclosure.

FIG. 3 illustrates an implementation of compress module 203 according to an embodiment. Compress module 203 includes input evaluation module 301, counter module 302, and output assembly module 303. Input evaluation module 301 and output assembly module 303 are connected to compress module interface 205. Input evaluation module is further connected to output assembly module 303 and counter 302. Counter 302 is further connected to output assembly module 303. Configuration information for compress module 203 is provided through control/status registers 112.

Compress module 203 compresses sparse matrices by replacing a succession of matrix values that are numerically close to zero followed by a larger value with the count of small or zero values followed by the larger value. Configuration information can include a range for which values will be considered to be equivalent to zero for purposes of compression. For sparse matrices such compression can result in a significant reduction in size of the compressed matrix when compared with the uncompressed matrix.

For example, compress module 203 can be provided with configuration information indicating that values greater than or equal to −0.1 and less than to 0.1 are to be considered zeroes for the purposes of compression. The matrix $$\begin{bmatrix} 7.0 & 0.0 & 0.01 \\ 0.0 & 5.3 & 0.02 \\ -0.1 & 0.02 & 42.0 \end{bmatrix}$$

can be provided to compress module 203 in a column first order. That is, the elements of the matrix are provided in the sequence 7.0, 0.0, −0.1, 0.0, 5.3, 0.02, 0.01, 0.02, and 42.0. Compression of the matrix begins by setting counter 302 to the value 0 and providing the first element, 7.0, to input evaluation module 301. Input evaluation module 301 determines that the value 7.0 is greater than 0.1, and provides the value to output assembly module 303. Output assembly module 303 provides the input value and value of counter 302 as output. Thus, output module 303 provides (0, 7.0) to DMA channel 1 via compress module interconnect 205. After providing the output, output assembly module 303 sets counter 302 to 0. The next element of the uncompressed matrix, 0.0, is then provided to input evaluation module 301. As this value is zero, input evaluation module increments counter 302 to the value 1 but does not provide the value 0.0 to output assembly module 303. The next element of the uncompressed matrix, −0.1, is provided to input evaluation module 301. The value is within the ranged indicated by configuration information to be considered as zero. Input evaluation module 301 increments counter 302 to the value 2 and does not provide the value to output assembly module 303. The next input value is 0.0. Similarly, input evaluation module increments counter 302 to the value 3 and does not provide the value to output assembly module 303. The next input value is 5.3. Input evaluation module 301 provides the input value to output assembly module 303. As the value of counter 302 is 3, output assembly module 303 provides (3, 5.3) to DMA channel 1 and sets counter 302 to 0. Compressing the input matrix continues in like manner, as illustrated at Table 1.

TABLE 1

| Input | Equivalent to 0? | New counter value | Output |
|---|---|---|---|
| 7.0 | No | 0 | (0, 7.0) |
| 0.0 | Yes | 1 | |
| −0.1 | Yes | 2 | |
| 0.0 | Yes | 3 | |
| 5.3 | No | 0 | (3, 5.3) |
| 0.02 | Yes | 1 | |
| 0.01 | Yes | 2 | |
| 0.02 | Yes | 3 | |
| 42.0 | No | 0 | (3, 42.0) |

The compressed matrix representation output by compress module 301 is (0, 7.0), (3, 5.3), (3, 42.0). Thus, the nine floating point values of the uncompressed matrix have been reduced to three integer values and three floating point values.

In this example, the last value to be output is non-zero. In the case of a matrix having the last element being zero, a last pair of values can be output indicating the number of zero values at the end of the uncompressed matrix.

As those skilled in the art will appreciate, a matrix uncompress module (not shown) can reconstruct matrices compressed as a matrix compress module. A matrix uncompress module can read pairs of elements from memory. When the first element of a pair has a zero value, the second element of the pair is written. When the first element of a pair has a non-zero value, one or more zero values are written. The count of zero values written is equal to the value of the first element. After the zero values are written, the matrix uncompress module writes the second element of the pair.

Figure 4:
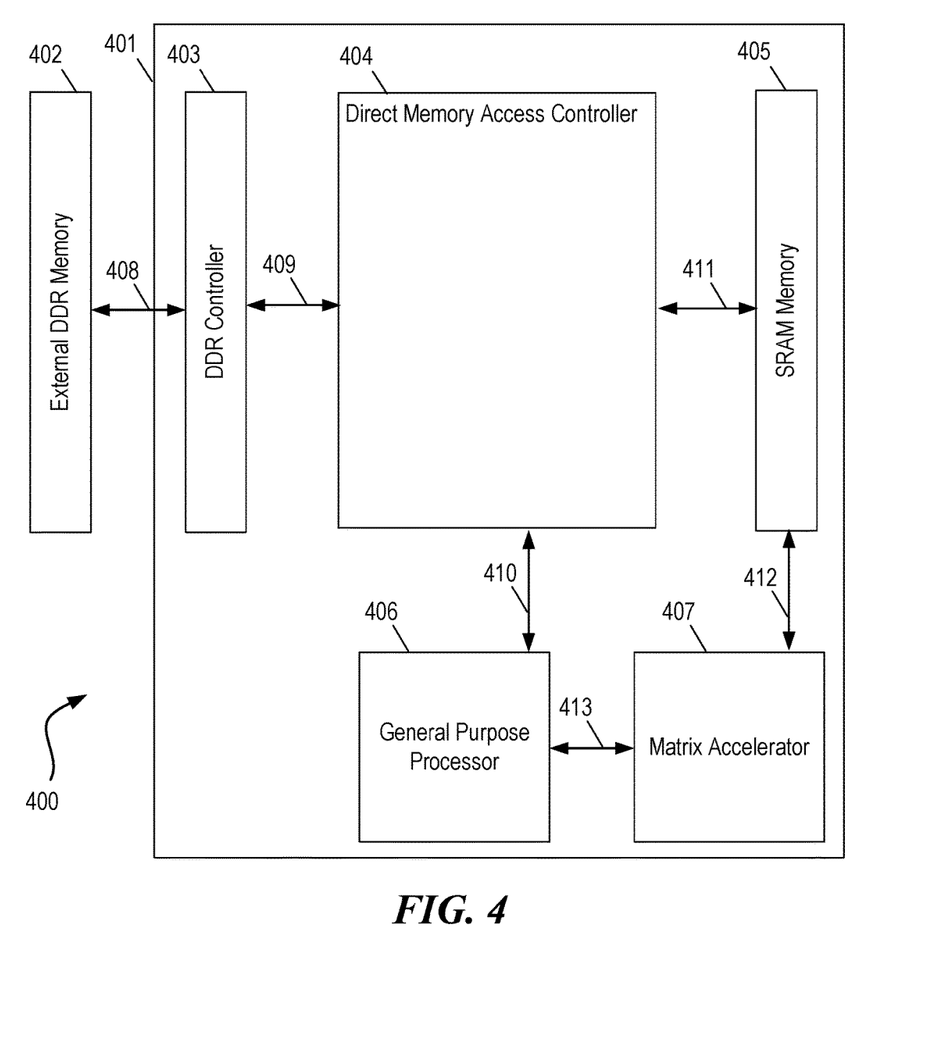
FIG. 4 is an illustration of another digital system according to at least one embodiment of the present disclosure.

FIG. 4 illustrates another embodiment of a data processing system 400 having a semiconductor device 401 and an external DDR memory 402. Semiconductor device 401 includes DDR controller 403, direct memory access controller 404, SRAM memory 405, general purpose processor 406 and matrix accelerator 407. DDR controller 403 is connected to external DDR memory 402 by DDR memory bus 408, and to direct memory access controller 404 by bus 409. Direct memory access controller 404 provides functionality as described with respect to direct memory access controller 104, including the compression and un-compression of matrices being transferred into and out of external memory. Direct memory access controller 404 is connected to general purpose processor 406 by control bus 410 and to SRAM memory 405 by SRAM memory interconnect 411. Matrix accelerator 407 is connected to SRAM memory 405 by SRAM memory interconnect 412 and to general purpose processor 406 by control bus 413.

During operation of data processing system 400, general purpose processor 406 can configure direct memory access controller 404 and matrix accelerator 407 in order to perform linear algebra computations using matrices. For example, general purpose processor 406 can configure direct memory access controller 404 through control bus 410 to load two compressed matrices from external DDR memory 402, un-compress the matrices, and store the uncompressed matrices at SRAM memory 405. General purpose processor 406 can then configure matrix accelerator 407 through control bus 413 to perform a matrix operation, for example a matrix multiply operation, and to store the result matrix at a location at SRAM memory 405. Upon being notified of the completion of the matrix operation by matrix accelerator 407, general purpose processor 406 can configure direct memory access controller 404 to read the uncompressed result matrix, compress the result matrix, and store the compressed result matrix at a location at external DDR memory 402. In an embodiment, general purpose processor 406 is an instruction-based data processor. Such processors are well known in the art and are used in a wide variety of electronic devices. An instruction-based processor used with the present disclosure can fetch instructions and data from a memory, for example from SRAM memory 405 through a bus connection (not shown). The general purpose processor then executes the instructions, writing information to control registers of direct memory access controller 404, matrix accelerator 407, other modules of data processing system 400 (not shown) or to a memory of data processing system 400.

Figure 5:
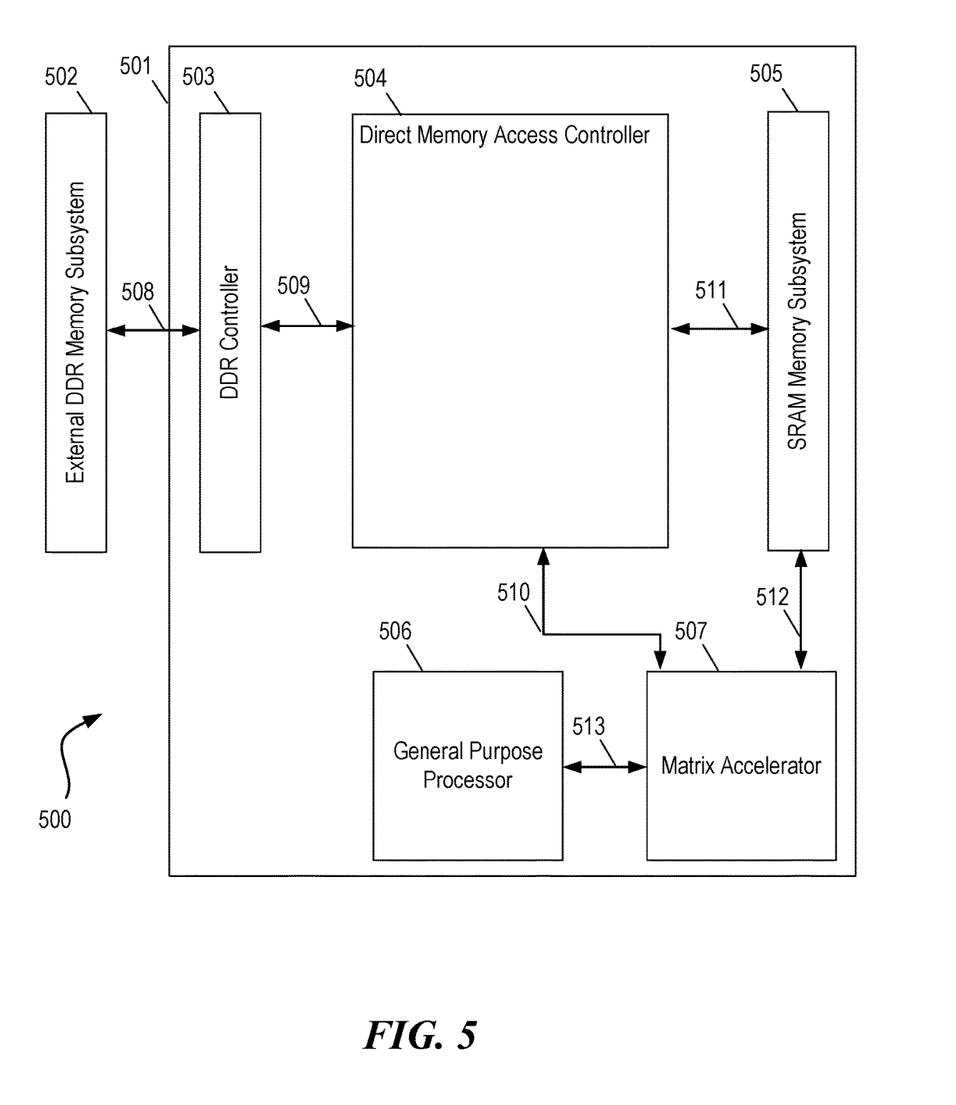
FIG. 5 is an illustration of yet another digital system according to at least one embodiment of the present disclosure.

FIG. 5 illustrates another embodiment of a data processing system 500 having a semiconductor device 501 and an external DDR memory subsystem 502. Semiconductor device 501 includes DDR controller 503, direct memory access controller 504, SRAM memory subsystem 505, general purpose processor 506 and matrix accelerator 507. DDR controller 503 is connected to external DDR memory subsystem 502 by DDR memory bus 508, and to direct memory access controller 504 by bus 509. Direct memory access controller 504 provides functionality as described with respect to direct memory access controller 104, including the compression and un-compression of matrices being transferred into and out of external memory. Direct memory access controller 504 is connected to matrix accelerator 507 by control bus 510 and to SRAM memory subsystem 505 by SRAM memory interconnect 511. Matrix accelerator 507 is connected to SRAM memory subsystem 505 by SRAM memory interconnect 512, to general purpose data processor 506 by control bus 513 and to direct memory access controller 504 by control bus 510. In an embodiment, matrix accelerator 507 includes a DMA control and status port connected to a control and status port of direct memory access controller 504 by control bus 510.

During operation of data processing system 500, general purpose processor 506 can control matrix accelerator 507 in order to perform linear algebra computations using matrices. For example, general purpose processor 506 can configure matrix accelerator 507 through control bus 513 to perform a matrix operation, for example a matrix multiply operation on two compressed matrices stored at particular locations in external DDR memory subsystem 502 Matrix accelerator 507 can configure direct memory access controller 504 through control bus 510 to load the two compressed matrices from external DDR memory subsystem 502, un-compress the matrices, and store the uncompressed matrices at SRAM memory subsystem 505. Matrix accelerator 507 can then perform the matrix multiply operation, storing the result matrix at a location at SRAM memory subsystem 505. Upon completion of the matrix multiply operation, matrix accelerator 507 can configure direct memory access controller 504 to retrieve the uncompressed result matrix from SRAM memory subsystem 505, compress the result matrix, and store the compressed result matrix at a location at external DDR memory subsystem 502. Matrix accelerator 507 can notify general purpose processor 506 through control bus 513 of the completion of the matrix multiply operation.

Although the present invention has been described with reference to two dimensional matrices, matrix data structures with more or less than two dimensions are well known in the art. As will be appreciated by those skilled in the art, the present invention can be extended for use with matrices having more than two dimensions. For example, a matrix having three dimensions can be viewed as an ordered set of two dimensional matrices. The ordering of the set is provided by the indices of the third dimension. Thus, a compressed three dimensional matrix can be represented as an ordered collection of compressed two dimensional matrices. A one dimensional matrix, also referred to as a vector, can be used with the present invention. For example, a vector can be treated has a two dimensional matrix having only a single row or column.

Those skilled in the art will further appreciate that hardware configurations in addition to the examples provided herein can be used with the present invention. In embodiments, a general purpose processor and a direct memory access controller can both be connected to an external memory controller, thus allowing an external memory to store code and data for the general purpose processor as well as compressed and uncompressed matrices. In an embodiment, a general purpose processor can be connected to an internal memory in parallel with a matrix accelerator. In yet another embodiment, control interconnects for a direct memory access controller and for a matrix accelerator can be a single internal bus. In various embodiments, more than one direct memory access controller can be provided in a single digital system. Each direct memory access controller can be connected to its own memory controller, with each controller connected to a distinct external memory, or the memory controllers can access different ports of a single multi-ported memory. In yet another embodiment, a digital system can have a first direct memory access controller providing transfers from an external memory to an internal memory, and a second direct memory access controller providing transfers from an internal memory to an external memory. In such a system, one direct memory access controller can provide compression and the other can provide un-compression. In further embodiments, a direct memory access controller can be configured to perform compression of matrices while uncompression is performed by another module in a data processing system, such as a general purpose instruction based processor. In another embodiment, a direct memory access controller can be configured to perform uncompression of matrices while compression is performed by another module in a data processing system, such as a general purpose instruction based processor.

What is claimed is:

1. An electronic device, comprising: a first memory subsystem having a first memory, and a first memory access port; a second memory subsystem having a second memory, and a second memory access port; and a direct memory access (DMA) controller coupled to the first memory access port and to the second memory access port, the DMA controller including: load circuitry to request an a first uncompressed matrix be retrieved from the first memory; compression circuitry to generate a first compressed matrix based upon the first uncompressed matrix, the compression circuitry including: an input evaluation module to determine whether or not elements of the first uncompressed matrix approximate a value of zero to within a threshold; a counter configured to be incremented when a first element of the first uncompressed matrix has approximately the value of zero to within the threshold, and to be reset to zero when a second element of the first uncompressed matrix does not have approximately the value of zero to within the threshold; and an output module to output an element of the first compressed matrix when the second element does not have approximately the value of zero to within the threshold; and store circuitry to request the first compressed matrix be stored to the second memory.

2. The electronic device of claim 1, wherein the load circuitry is further configured to request a second compressed matrix to be retrieved from the second memory, and the DMA controller further includes decompression circuitry to generate a second uncompressed matrix, and the store circuitry is further to request the second uncompressed matrix, generated from the decompression circuitry, to be stored to the first memory.

3. The electronic device of claim 2, wherein the store circuitry further provides the second compressed matrix to the second memory.

4. The device of claim 1, wherein the compression circuitry is further configured to generate the first compressed matrix based in response to an indicator at a storage location of the DMA controller being asserted, otherwise, in response to the indicator being negated, the compression circuitry is configured to not generate the first compressed matrix.

5. The device of claim 1, wherein the store circuitry is configured to request the first compressed matrix be stored to the second memory when an indicator at a storage location is asserted, otherwise, when the indicator is negated, the store circuitry is configured to request the first uncompressed matrix be stored to the second memory.

6. The electronic device of claim 1, further including a first processor coupled to the DMA controller, and configured to provide first information to the DMA controller indicating a location of the first uncompressed matrix, and second information indicating whether the compression circuitry is to generate the first compressed matrix, and the store circuitry is further configured to request either the first compressed matrix or the first uncompressed matrix be stored based upon the second information.

7. The electronic device of claim 6, wherein the first processor is a general purpose instruction based processor.

8. The electronic device of claim 6, wherein the first processor is a matrix accelerator configured to perform an arithmetic operation on a received matrix, and the device further includes a second processor coupled to the matrix accelerator to provide command information from which the matrix accelerator determines the first information, the second information, and the arithmetic operation to be performed, the second processor being an instruction-based data processor.

9. The electronic device of claim 1, wherein a value (X) is approximated to zero when the value satisfies: $0.1 > X > 0.1$.

10. A method, comprising: receiving a first uncompressed matrix into a direct memory access (DMA) controller from a first memory subsystem; compressing, by the DMA controller, the first uncompressed matrix to generate a first compressed matrix based upon the first uncompressed matrix received from the first memory subsystem, wherein, in compressing the first uncompressed matrix, the method further comprises: determining whether or not elements of the first uncompressed matrix approximate a value of zero to within a threshold; incrementing a counter when a first element of the first uncompressed matrix has approximately the value of zero to within the threshold; resetting the counter when a second element of the first uncompressed matrix does not have approximately the value of zero to within the threshold; and outputting an element of the first compressed matrix when the second element does not have approximately the value of zero to within the threshold; and providing the first compressed matrix to a second memory subsystem.

11. The method of claim 10, further comprising the DMA controller providing the first uncompressed matrix to the first memory subsystem prior to receiving the first uncompressed matrix.

12. The method of claim 10, further comprising:
receiving the first uncompressed matrix into a data processor from the first memory subsystem;
modifying the first uncompressed matrix by the data processor;
providing the modified first uncompressed matrix to the first memory subsystem by the data processor;
receiving the modified first uncompressed matrix into the DMA controller from the first memory subsystem;
compressing, by the DMA controller, the modified first uncompressed matrix to generate a modified compressed matrix based upon the modified first uncompressed matrix; and
providing the modified compressed matrix to the second memory subsystem.

13. The method of claim 10, further comprising:
retrieving a second compressed matrix into the DMA controller from the second memory subsystem;
uncompressing, by the DMA controller, the second compressed matrix to generate a second uncompressed matrix based upon the second compressed matrix received from the second memory subsystem; and
providing the second uncompressed matrix to the first memory subsystem.

14. The method of claim 13, further comprising:
receiving a third uncompressed matrix into the direct memory access (DMA) controller from a first memory subsystem;
compressing, by the DMA controller, the third uncompressed matrix to generate a third compressed matrix based upon the third uncompressed matrix received from the first memory subsystem; and
providing the third compressed matrix to a second memory subsystem.

15. The method of claim 10, further comprising receiving commands to retrieve the first uncompressed memory and to provide the first compressed memory at a control and status port of the direct memory access controller.

16. The method of claim 15, wherein the commands are provided by a matrix accelerator.

17. The method of claim 10, further comprising:
receiving a second uncompressed matrix into the DMA controller from a first memory subsystem;
providing a second compressed matrix, based on the second uncompressed matrix, to the second memory subsystem if an indicator at a storage location of the DMA controller is asserted, otherwise, if the indicator is negated, providing the second uncompressed to the second memory subsystem.

18. The method of claim 17 further comprising compressing, by the DMA controller, the second uncompressed matrix to generate the second compressed matrix based upon the second uncompressed matrix if the indicator is asserted, otherwise not compressing the second uncompressed matrix.

19. The method of claim 10, wherein a value (X) is approximated to zero when the value satisfies: $0.1 > X > 0.1$.

* * * * *